P. HUGHES.
CAR-BRAKES.

No. 179,312. Patented June 27, 1876.

WITNESSES:
C. Neveux
John Goethals

INVENTOR:
P. Hughes
BY
ATTORNEYS.

UNITED STATES PATENT OFFICE.

PETER HUGHES, OF NEW YORK, N. Y.

IMPROVEMENT IN CAR-BRAKES.

Specification forming part of Letters Patent No. 179,312, dated June 27, 1876; application filed March 21, 1876.

*To all whom it may concern:*

Be it known that I, PETER HUGHES, of the city, county, and State of New York, have invented a new and Improved Car-Brake, of which the following is a specification:

My invention consists of a yoke spanning a friction-wheel on each axle of the car, and having a little motion forward and backward, so as to be driven against the wheel from either end of the car, which said yokes are connected together between the axles, and connected at each end of the car with a brake-lever rising up in front of the platform, so that it can be worked to apply the power.

Figure 1:
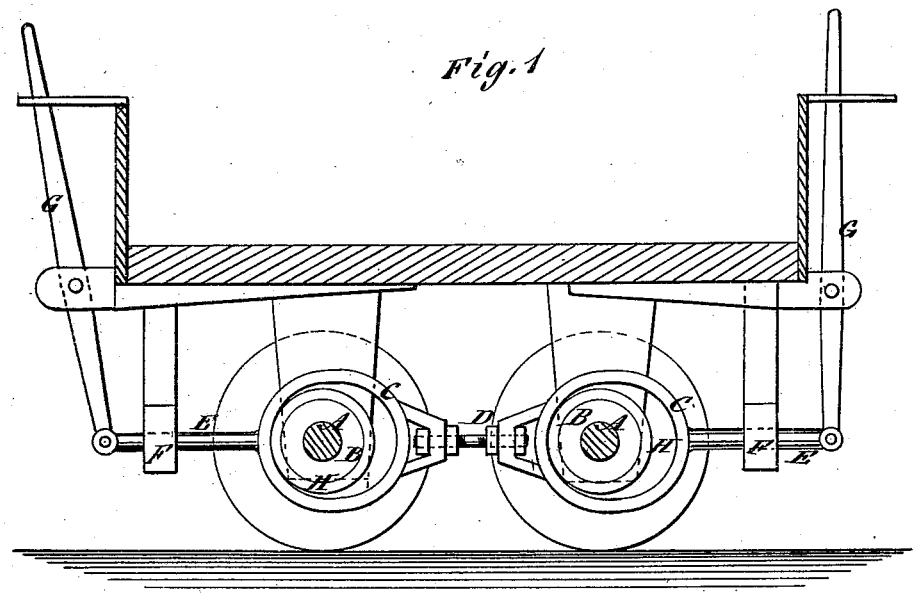
Figure 2:
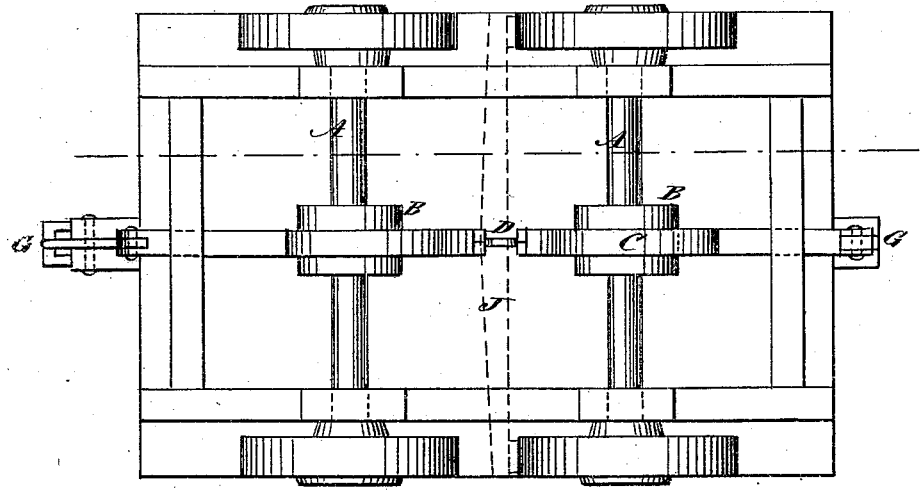

Figure 1 is a longitudinal sectional elevation of my improved brake applied to a car, the section being taken on line $x$ $x$, Fig. 2, and Fig. 2 is a plan view.

Similar letters of reference indicate corresponding parts.

A represents the car-axles, on each of which is a rubber-shod brake-wheel, B, surrounded by a yoke, C, the yokes being connected together at D, and also connected to the sliding rods E, arranged in supports F depending from the car-body, and being connected to the brake-levers G arranged at the ends of the car, so that the driver can force the brakes on the wheels at will.

The rubber, which is represented at H, on the brake-wheels, may be transferred to the yokes, and the ordinary brakes may be shod with rubber, which is more effective for practical purposes than metal, and such brakes may also be coupled with my improved brakes, if desired, by arranging them as represented by the dotted lines J, and connecting them to the yokes.

The coupling at D is adjustable to allow of adjusting the two yokes, so that they will both bear properly on the friction-wheels.

Having thus described my invention, I claim as new and desire to secure by Letters Patent—

The combination of yokes C, rods E, and levers G with friction-wheels B on the car-axles A, substantially as specified.

PETER HUGHES.

Witnesses:
T. B. MOSHER,
ALEX. F. ROBERTS.